United States Patent
Liu et al.

(10) Patent No.: US 11,126,501 B2
(45) Date of Patent: Sep. 21, 2021

(54) METHOD, DEVICE AND PROGRAM PRODUCT FOR AVOIDING A FAULT EVENT OF A DISK ARRAY

(71) Applicant: EMC IP Holding Company LLC, Hopkinton, MA (US)

(72) Inventors: Qingyun Liu, Beijing (CN); Hongpo Gao, Beijing (CN); Jianbin Kang, Beijing (CN); Geng Han, Beijing (CN); Ping Ge, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/801,997

(22) Filed: Feb. 26, 2020

(65) Prior Publication Data
US 2020/0349003 A1 Nov. 5, 2020

(30) Foreign Application Priority Data
Apr. 30, 2019 (CN) .......................... 201910360907.1

(51) Int. Cl.
*G06F 11/10* (2006.01)
*G06F 11/07* (2006.01)
*G06F 11/32* (2006.01)
*G06F 11/30* (2006.01)

(52) U.S. Cl.
CPC ...... *G06F 11/1076* (2013.01); *G06F 11/0772* (2013.01); *G06F 11/0784* (2013.01); *G06F 11/0787* (2013.01); *G06F 11/3034* (2013.01); *G06F 11/327* (2013.01)

(58) Field of Classification Search
CPC .............. G06F 11/0766; G06F 11/079; G06F 11/0793; G06F 11/0787; G06F 11/0784; G06F 11/3034; G06F 11/327; G06F 11/1076; G06F 11/0772
See application file for complete search history.

(56) References Cited

U.S. PATENT DOCUMENTS

| | | | |
|---|---|---|---|
| 8,904,063 B1 * | 12/2014 | Sandstrom | G06F 11/3476 710/39 |
| 9,307,015 B1 | 4/2016 | Bauer et al. | |
| 9,535,779 B1 * | 1/2017 | Ma | G06F 11/008 |
| 9,886,338 B1 | 2/2018 | Khokhar et al. | |
| 10,346,238 B2 | 7/2019 | Lv et al. | |
| 2015/0074462 A1 * | 3/2015 | Jacoby | G06F 11/0727 714/37 |
| 2015/0074468 A1 * | 3/2015 | Jacoby | G06F 11/008 714/47.1 |
| 2015/0205657 A1 * | 7/2015 | Clark | G06F 11/008 714/47.3 |
| 2016/0292025 A1 * | 10/2016 | Gupta | G06F 11/008 |
| 2017/0269985 A1 * | 9/2017 | Xiao | G06F 16/285 |
| 2017/0344431 A1 * | 11/2017 | Coatney | G06F 11/004 |

(Continued)

*Primary Examiner* — Matthew M Kim
*Assistant Examiner* — Kurosu Risa Altaf
(74) *Attorney, Agent, or Firm* — BainwoodHuang

(57) ABSTRACT

Techniques involve avoiding a potential failure event on a disk array. Along these lines, data collected for a disk array are obtained. It is determined, based on the collected data, whether a potential failure event is to occur on the disk array. In response to determining that the potential failure event is to occur on the disk array, an action to be taken for the disk array is determined, to avoid occurrence of the potential failure event.

18 Claims, 8 Drawing Sheets

(56) References Cited

U.S. PATENT DOCUMENTS

2018/0025299 A1\* 1/2018 Kumar .................... G06F 3/064
                                                    709/224
2020/0218617 A1\* 7/2020 Knestele ............... G06F 9/5027

\* cited by examiner

METHOD, DEVICE AND PROGRAM PRODUCT FOR AVOIDING A FAULT EVENT OF A DISK ARRAY

CROSS REFERENCE TO RELATED APPLICATION

This application claims priority to Chinese Patent Application No. CN201910360907.1, on file at the China National Intellectual Property Administration (CNIPA), having a filing date of Apr. 30, 2019, and having "METHOD, DEVICE AND PROGRAM PRODUCT FOR AVOIDING A FAULT EVENT OF A DISK ARRAY" as a title, the contents and teachings of which are herein incorporated by reference in their entirety.

FIELD

Embodiments of the present disclosure generally relate to a computer technology, and more specifically, to a method, device and computer program product for avoiding a potential failure event of a disk array.

BACKGROUND

In order to achieve high reliability, a storage system may include two storage pools (simply referred to as SP) both working in an active mode. When one of the storage pools is out of service, the other storage pool is to serve all the input/output (IO) requests. The two storage pools can communicate with each other via a connection and a service provided by an operator. The connection between the storage pools may be a Peripheral Component Interconnect express (PCIe)-based link connection. In the storage system, the internal transport and service protocol is deployed based on the link. As such, users may benefit from continuous availability and load balancing of the storage system. However, if the two storage pools are out of service almost at the same time, users will be not able to access the data in the storage system, causing a data unavailable (DU) issue. In the situation, users will be very unsatisfied and the system support will be put great pressure.

In addition, except that a layer of a redundant array of independent disks (RAID) is a thick block device, modern storage vendors almost all employ the Thin Provisioning (simply referred to as TP) technology for providing a storage service to users, and often expose the Thin Provisioning logic unit number (LUN) to users. For example, conventionally, a storage pool may be provided with a bunch of RAID groups (RGs) having the same RAID type and width (i.e., the number of disks in the RG). In addition, the storage pool is provided with a dedicated component to maintain a mapping between a thin LUN address space and a thick LUN address space, such that slices from the thick LUN can be initialized, or slices can be allocated from the thick LUN space to the thin LUN space, as needed.

Generally, the RGs using the same drive technology in the same storage pool have the same RAID type and width. The drive technology, for example, includes Nearline-Serial Attached Small Computer System Interface (NL-SAS), Serial Attached Small Computer System Interface (SAS), Solid State Drive (SSD), or the like. In the storage pool, it is required to provide a disk array with a backup driver. Each storage pool may be provided with a separate backup driver, or a backup driver may be shared between the storage pools.

There further exists a dynamic storage pool. The dynamic storage pool changes the storage pool backup layout and introduces a new disk layout, in which the dedicated backup drive is removed and the backup capacity is allocated to all drives in the storage pool. During the configuration of such a storage pool, each RAID group built may be supported by conventional RAID configuration. Each RAID group may naturally distribute IO requests evenly across all drives, and the backup space is shared by all RAID groups.

For a storage device, data unavailable (DU) and/or data lost (DL) rates are important indicators to measure its reliability. Low DU and DL rates may improve users' satisfaction and thus increase business volume. Therefore, there arises a need of an effective way of avoiding potential DU and/or DL events or issues.

SUMMARY

In general, embodiments of the present disclosure provide a method, device and computer program product for avoiding a potential failure event on a disk array.

In a first aspect, embodiments of the present disclosure provide a method of avoiding a potential failure event on a disk array. In the method, data collected for the disk array are obtained. It is determined, based on the collected data, whether the potential failure event is to occur on the disk array. In response to determining that the potential failure event is to occur on the disk array, an action to be taken for the disk array is determined to avoid occurrence of the potential failure event.

In a second aspect, embodiments of the present disclosure provide a device for avoiding a potential failure event on a disk array. The device includes a processor and a memory storing computer executable instructions. The computer executable instructions, when executed by the processor, cause the device to perform operations, the operation including: obtaining data collected for the disk array; determining, based on the collected data, whether the potential failure event is to occur on the disk array; and in response to determining that the potential failure event is to occur on the disk array, determining an action to be taken for the disk array, to avoid occurrence of the potential failure event.

In a third aspect, embodiments of the present disclosure provide a computer program product. The computer program product is tangibly stored on a non-transient computer readable medium and includes machine executable instructions. The machine executable instructions, when executed, cause a machine to perform the method according to the first aspect.

It would be appreciated that this Summary is not intended to identify key features or essential features of the present disclosure, nor is it intended to be used to limit the scope of the present disclosure. Other features of the present disclosure will become apparent through the following description.

BRIEF DESCRIPTION OF THE DRAWINGS

The above and other features, advantages and aspects of example embodiments of the present disclosure will become more apparent, through the following detailed description with reference to the accompanying drawings. Throughout the drawings, the same reference symbol generally refers to the same component.

DETAILED DESCRIPTION

Figure 1:
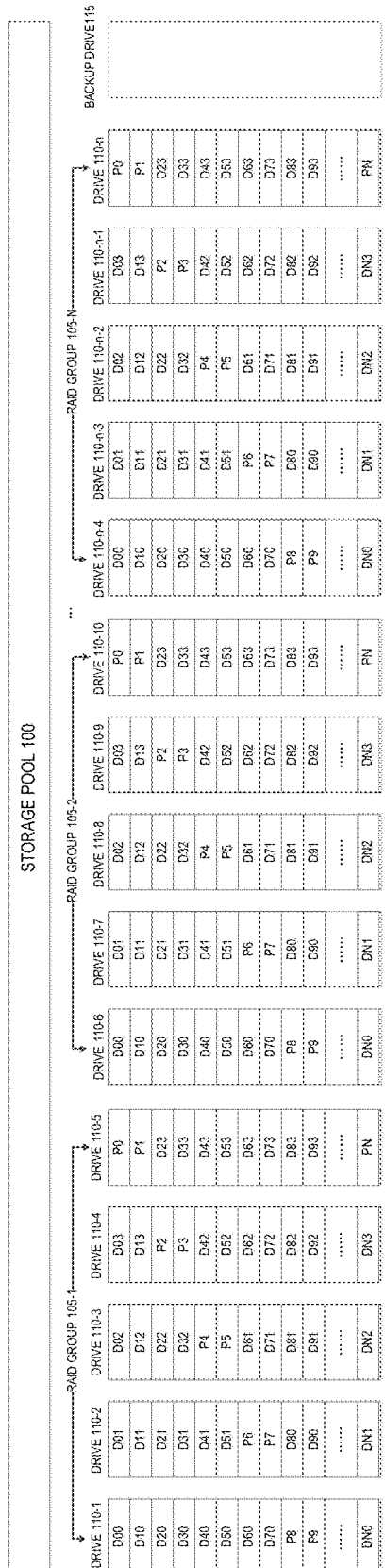
FIG. 1 illustrates an example structure of a storage pool including RAID groups (RGs) and a backup drive.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will now be described in more detail with reference to the drawings. Although some embodiments of the present disclosure are illustrated in the drawings, it would be appreciated that the present disclosure may be implemented in various manners, and would not be explained as limited by the embodiments as described herein. Rather, those embodiments are provided to understand the present disclosure more thoroughly and completely. It would be appreciated that the drawings and embodiments of the present disclosure are provided merely by way of example, rather than limiting the protection scope of the present disclosure.

As used herein, the term "includes" and its variants are to be read as open-ended terms that mean "includes, but is not limited to." The term "based on" is to be read as "based at least in part on." The term "an embodiment" is to be read as "at least one embodiment," and the term "another embodiment" is to be read as "at least one other embodiment." Definitions to other terms may be given below.

Typically, in a storage pool, it is required to configure a backup drive for a disk array. FIG. 1 illustrates an example structure of a storage pool 100 including RAID groups (RGs) and backup drives. As shown, in the storage pool 100, each of RAID groups 105-1 . . . 105-N (where N is any appropriate positive integer) is configured with five drives 110-1 . . . 110-n (where n=5N). For ease of discussion, the RAID groups 105-1 . . . 105-N are collectively or individually referred to as RAID group 105, and the drives 110-1 . . . 110-n are collectively or individually referred to as drive 110.

The storage pool 110 further includes a dedicated backup drive 115. The backup drive 115 may be shared among the RAID groups 105, for recovering the damaged RAID group 105 to a healthy state. For example, if a certain RAID in the RAID group 105 is damaged, the backup drive 115 may act as a backup for restoring the RAID group 105. If a lifespan of a drive 100 in the RAID group 105 is ended, the backup drive 115 may act as a backup for replicating the drive 110.

Figure 2:
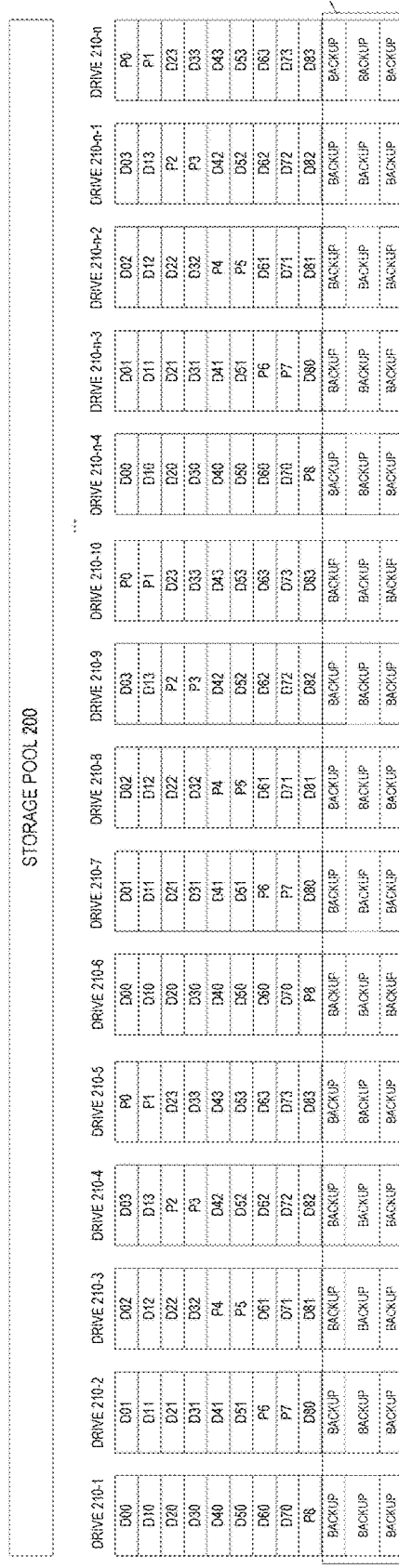
FIG. 2 illustrates an example structure of a dynamic storage pool.

There exists also a dynamic storage pool, where the dedicated backup drive is removed, and the backup capacity is distributed to all drives in the storage pool. FIG. 2 illustrates an example structure of a dynamic storage pool 200. As shown in FIG. 2, the drives 210-1 . . . 210-n (which are collectively or individually referred to as drive 210) are shared in the storage pool 200. Each drive 210 is provided with a backup capacity, to form a backup space 215. Accordingly, the backup space 215 is shared among all the RAID groups in the storage pool 200.

For a storage device, data unavailable (DU) and/or data lost (DL) rates are important indicators to measure its reliability. Low DU and DL rates may improve users' satisfaction and thus increase business volume. A conventional way of reducing the DU and DL rates is to improve the code quality, but software deficiencies are difficult to eliminate. At the user side, DU and/or DL events often occur inevitably due to known or unknown software deficiencies.

Once DU and/or DL events occur, users get anxious and thus need to take a remedy operation immediately. If the underlying reason for the DU and/DL events can be known, users would be notified of a triggering condition of the issue and the action to be taken when this issue occurs, and would be explained the underlying reason. However, this is too late, because DU and/or DL have already occurred. Especially, for DL cases, recovery is almost not possible. Hence, there arises a need of an effective way of avoiding potential DU and/or DL events or issues.

A conventional approach of avoiding DU and/DL events is to build a knowledge database (KB) for including various issues and deficiencies of the storage device. Whenever technicians have found an issue, they may write the issue and a solution thereof into the knowledge database in a user-reviewable format, for users' review. For simple issues, relevant articles may be included in the knowledge database, to tell the user how to operate to avoid DU and DL issues. However, not all users will review the articles in the knowledge database. In addition, if there are too many relevant articles, the user may be confused.

For technical reasons, it is difficult to rely on users to find potential issues and avoid occurrence of the DU/DL events. Moreover, even special fixes cannot solve the issue. Firstly, not all issues are delivered as fixes to users. Further, some issues are exposed during Non-Disruptive Upgrade (NDU). For these issues, it is impossible to prepare available fixes in advance.

In addition, fixes are not suitable for hardware-related issues. For example, a known DL issue is related to utilization of a drive with a large capacity on an encrypted disk array. This issue cannot be solved by providing fix programs, and thus, it is unlikely to reduce the risk of data lost. Considering the typical capacity of the drive being not too large, there were few DL issues in the past. However, with the growth of the drive capacity, it can be envisioned that a lot of users will encounter the issue, which will be definitely a disaster. This issue exposes after the storage pool is rebooted. Once the storage pool is rebooted, there exists a risk of data lost, so upgrade is not possible. Hence, it is urgent to find an effective way of detecting whether there is the above issue on the user's disk array and telling the user to migrate the data timely to avoid data lost. Otherwise, once the storage pool is rebooted, users may face the risk of data lost.

Currently, at the user side, there still lacks a good solution to avoid a potential failure event on a disk array. Therefore, similar DU/DL events continuously occur, and the number is increasing, causing a very bad impact at the user side. For example, an edge damage error, a system drive EOL flag not clearing issue, an IO verification error issue, and the like, lead to occurrence of many DU and/or DL issues. Therefore, an effective method is required for detecting potential issues on a user's disk array, and providing an appropriate action plan to avoid occurrence of DU and/or DL issues and the like.

Embodiments of the present disclosure provide a mechanism of avoiding occurrence of a potential failure event on a disk array, to avoid occurrence of the events, such as data unavailable (DU) and/or data lost (DL) events, or the like, on a disk array. According to the mechanism, first, data collected for the disk array are obtained. Based on the collected data, it is determined whether a potential failure event is to occur on the disk array. If the potential failure event is to occur, an action to be taken for the disk array is determined to avoid occurrence of the potential failure event.

In some embodiments, a potential failure event (for example, a DU and/or DL event) on a disk array of a user may be detected based on cloud service. In some embodiments, a knowledge database may be provided for including potential failure events and related description information. The description information of a failure event may include a triggering condition of the failure event and an action for avoiding occurrence of the failure event. In some embodiments, a matching algorithm may be used, in which whether a potential DU and/or DL issue exists on the user's disk array is determined based on a matching between the data collected for the disk array and the information in the knowledge database. In some embodiments, a failure report on a disk array may be generated to indicate the detected potential failure event and an action to avoid the failure event. Accordingly, the user may perform a necessary action to avoid the occurrence of the respective failure event. In this way, a probability of the potential event occurring on the disk array may be reduced significantly, thereby improving the user's satisfaction and user experience.

Figure 3:
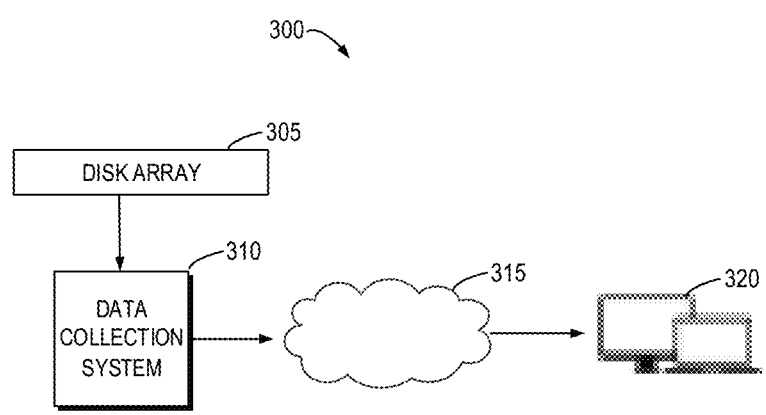
FIG. 3 illustrates an example environment in which embodiments of the present disclosure may be implemented.

FIG. 3 illustrates an example environment 300 in which embodiments of the present disclosure may be implemented. As shown in FIG. 3, the environment 300 includes a disk array 305 which may be a logic disk group comprised of a plurality of physical disks in any appropriate manner. As an example, the disk array 305 may include different levels of RAIDs, such as RAID 5, RAID 6, and the like.

In this example, the environment 300 further includes a data collection system 310 responsible for collecting data on the disk array 305. For example, a Software as a Service (SaaS) management application may be installed on the data collection system 310. The application may monitor and measure the overall running state of the disk array 305 and other disk arrays or the storage system (not shown). The SaaS management application may perform monitoring and measurement through intelligent, comprehensive and predictive analysis.

The health check on the disk array 305 may be performed according to the categories as shown in Table 1 below.

TABLE 1

| Storage category | Sampling health check |
|---|---|
| System health condition | Failure component |
| Configuration | Non-High Availability (HA) host connection |
| Capacity | Storage pools oversubscribed, reaching full capacity |
| Performance | High Central Processing Unit (CPU) utilization, and imbalanced storage pool |
| Data protection | Recovery Point Objective (RPO) not being satisfied, and snapshot policy not being satisfied |

The data collection system 310 may periodically collect data from the disk array 305 at the user side. The period may be set according to the storage category. For example, reminder and/or performance data may be collected every 5 minutes, capacity and/or configuration data may be collected per hour, and the like. The data collection system 310 may support cloud service, for example, by reporting the collected data via cloud 315. As an example, the data collection system 310 may send the collected data to a cloud server (not shown) via a secure remote connection service.

As shown in FIG. 3, the environment 300 includes a computing device 320 which can obtain the data collected for the disk array 305 and analyze the data, to determine a potential failure event on the disk array 305 and a respective action to avoid the failure event. As an example, the computing device 320 may also support cloud service to obtain data of the disk array 305, for example, via the cloud 315. The computing device 320 may be any appropriate device having a computing capability, for example, including, but not limited to, a Personal Computer (PC), a laptop computer, a tablet computer, a Personal Digital Assistant (PDA), a blade machine, and the like.

It would be appreciated that, only for example, without limitation, FIG. 3 illustrates an arrangement of the environment 300. In some embodiments, the computing device 320 may directly collect the data of the disk array 305. For example, the computing device 320 may be installed with a SaaS management application supporting cloud service, for gathering the collected data of the disk array 305 via the cloud 315 and then analyzing the data, to determine the potential failure event on the disk array 305 and a respective action.

Figure 4:
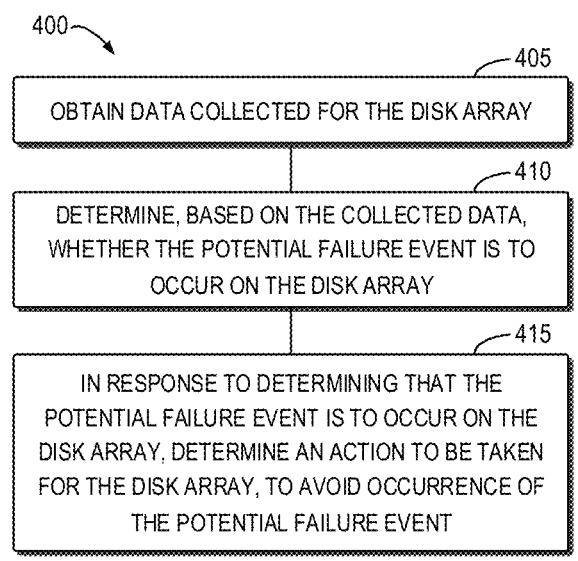
FIG. 4 illustrates a flowchart of an example method of avoiding a potential failure event on a disk array according to some embodiments of the present disclosure.

FIG. 4 illustrates a flowchart of an example method 400 of avoiding a potential failure event on a disk array according to some embodiments of the present disclosure. The method 400 may be implemented at the computing device 320 as shown in FIG. 3. For the purpose of discussion, the method 400 will be described below with reference to FIG. 3.

As shown in FIG. 4, at block 405, data collected for the disk array 305 are obtained. For example, the data collection system 310 may collect the data of the disk array 305 daily, and upload the data to the cloud 315. Accordingly, the computing device 320 may daily obtain the collected data of the disk array 305 from the cloud 315.

The collected data of the disk array 305 may include any appropriate information related to the disk array 305, such as Ktrace information, version information, database configuration information, drive state, storage pool capacity information, information output by other internal tools, and the like. These data may reflect the current state of the disk array 305, for example, whether the related storage pool is healthy, whether it is an encrypted array, whether the database configuration damage exists, and the like.

At block 410, it is determined, based on the collected data, whether the potential failure event is to occur on the disk array 305. In some embodiments, based on the collected data, it may be determined whether a triggering condition of the potential failure event is satisfied. The satisfaction of the triggering condition may be determined based on historical failure events and using a matching algorithm.

For example, in some embodiments, statistics may be performed on the historical failure events, to generate description information of the historical failure events. The historical failure events may be failure events that have been found or reported by users. The description information of the historical failure events may include triggering conditions of the historical failure events. Further, whether the condition is satisfied can be determined by matching the collected data with the condition information. Since matching of the collected data with the conditions relies on the professional knowledge in the art, this can be implemented by an automatic tool written by those skilled in the specific art.

At block 415, in response to determining that the potential failure event is to occur on the disk array 305, an action to be taken for the disk array 305 is determined to avoid occurrence of the potential failure event. The action to be taken may be designed according to the underlying reason for the occurrence of the failure event, to avoid the failure event. In some embodiments, the description information of the historical failure events may include an action to avoid the occurrence of the historical failure event. For example, after a certain failure event, such as a DU or DL event, has been found or reported by the user, the triggering condition of the failure event may be determined by analyzing the underlying reason for the failure event, and then, the action to avoid the occurrence of the failure event and the related recovery method may be found. Accordingly, in the case of determining that a certain historical failure event will probably occur, the action included in the description information of the respective historical failure event is determined as the action to be taken.

Figure 5:
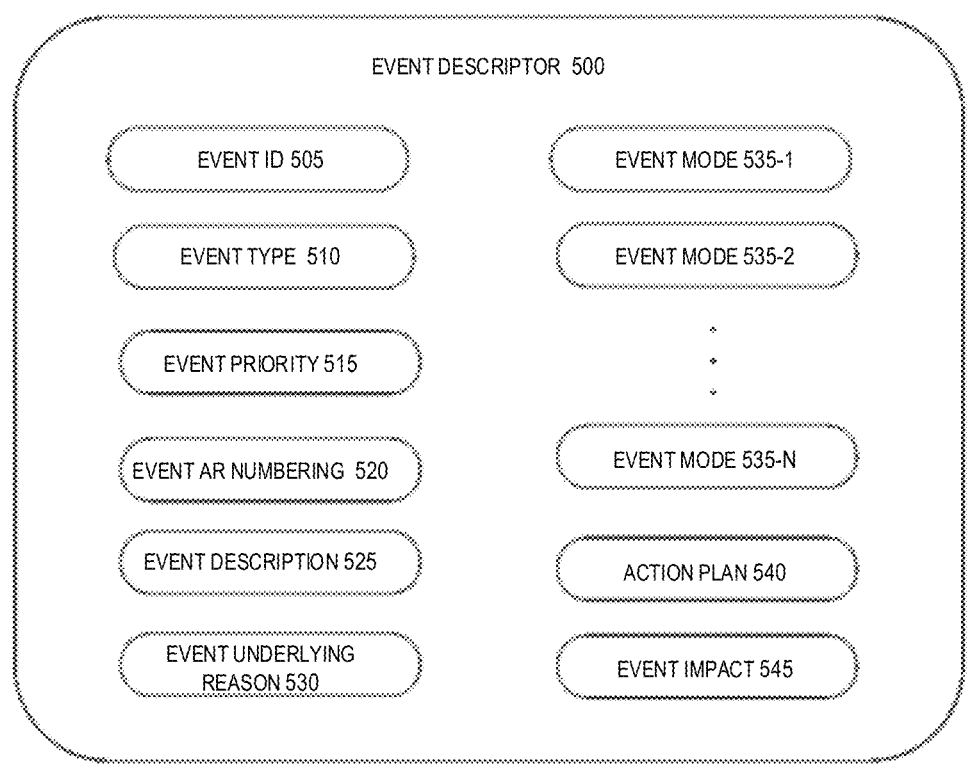
FIG. 5 illustrates an example of description information of a failure event according to some embodiments of the present disclosure.

In addition to the triggering condition of the failure event and the action to avoid the failure event, the description information of the failure event may further include any other appropriate information. FIG. 5 illustrates an example of description information of a failure event. In this example, the description information is represented by a descriptor 500 of the event. The descriptor 500 of the event includes an event identifier (ID) 505, an event type 510, an event priority 515, an event array (AR) numbering 520, event description 525, an event underlying reason 530 and event modes 535-1, 535-2 . . . 535-n (which are collectively or individually referred to as event mode 535, where n is any appropriate positive integer), an action plan 540, and event impact 545.

The attributes or definitions of the event descriptor 500 are given below:
  Event ID 505: the unique ID of the event.
  Event type 510: three types: (a) DL event; (b) DU event; and (c) other events.
  Event priority: three priorities: (a) P00 (DL event); (b) P01 (DU event); and (c) P02 (other events); where P00 has the highest priority.
  Event AR numbering 520: the related tracking AR of the event.
  Event description 525: the brief description of the event.
  Event underlying reason 530: the explanation to user reviewable underlying reason.
  Event impact 545: the resulting impact if the event occurs on the disk array and remains unsolved.
  Event modes 535-1 . . . 535-n: indicating a triggering condition of the event, generally, one event may have a plurality of triggering conditions.
  Action plan 540: the solution to the event; and a feasible action to avoid the event.

In some embodiments, a knowledge database may be provided for including description information of various failure events. For example, the event descriptor 500 may act as an input of the knowledge database. All known DU and DL events, without available fixes, occurring on the disk array at the user side can be used as inputs to the knowledge database.

By using the knowledge database, the collected data of the disk array 305 may be analyzed through a matching algorithm. For example, the triggering condition (or mode) of each of the known failure events (for example, a DU or DL event) is included in the knowledge database. By matching the collected data with these conditions or modes, it is determined whether a respective failure event will occur. If the collected data match all or some conditions or modes of a known event, it may be determined that a potential failure event will occur on the disk array 305. In addition, the action to be taken may be determined using an action to avoid a failure event included in the knowledge database, to avoid the occurrence of a potential failure event. After traversing all failure events in the knowledge database, all potential failure events on the disk array 305 may be determined, and respective actions may be determined. By using the knowledge database, the detection efficiency and the probability of avoiding potential failure events may be improved significantly.

In some embodiments, a failure report of the disk array 305 may be generated, to indicate a potential failure event to occur and an action to be taken to avoid the event. For example, a complete failure report of the disk array 305 may be generated, based on all potential failure events on the disk array 305 and respective actions, to avoid the occurrence of those failure events at the user side.

In some embodiments, the generated failure report may be sent via the cloud 320, for example, uploaded to the cloud server. As such, the user may access the server at any time (for example, via a browser), and review the failure report.

In some embodiments, if there exist some particular potential failure events (for example, DU and/or DL events), an alert or call may be triggered to remind a user to take an action immediately. In some embodiments, different triggering conditions of a failure event may be associated with different reminding ways. For example, different reminding ways may be set for users, according to the severity levels of the triggering conditions. Through performing the respective actions, potential failure events may be well avoided at the user side, which will improve significantly the user experience and satisfaction as well as obviously saves the support work of the storage system.

The example process of avoiding occurrence of a potential failure event on the disk array 305 is to be described below with reference to FIG. 6. In this example, the computing device 320 obtains the collected data of the disk array 305 via the cloud 315, and further executes the process 600, to avoid occurrence of the potential failure event on the disk array 305. The collected data are analyzed using the information recorded in the knowledge database.

Figure 6:
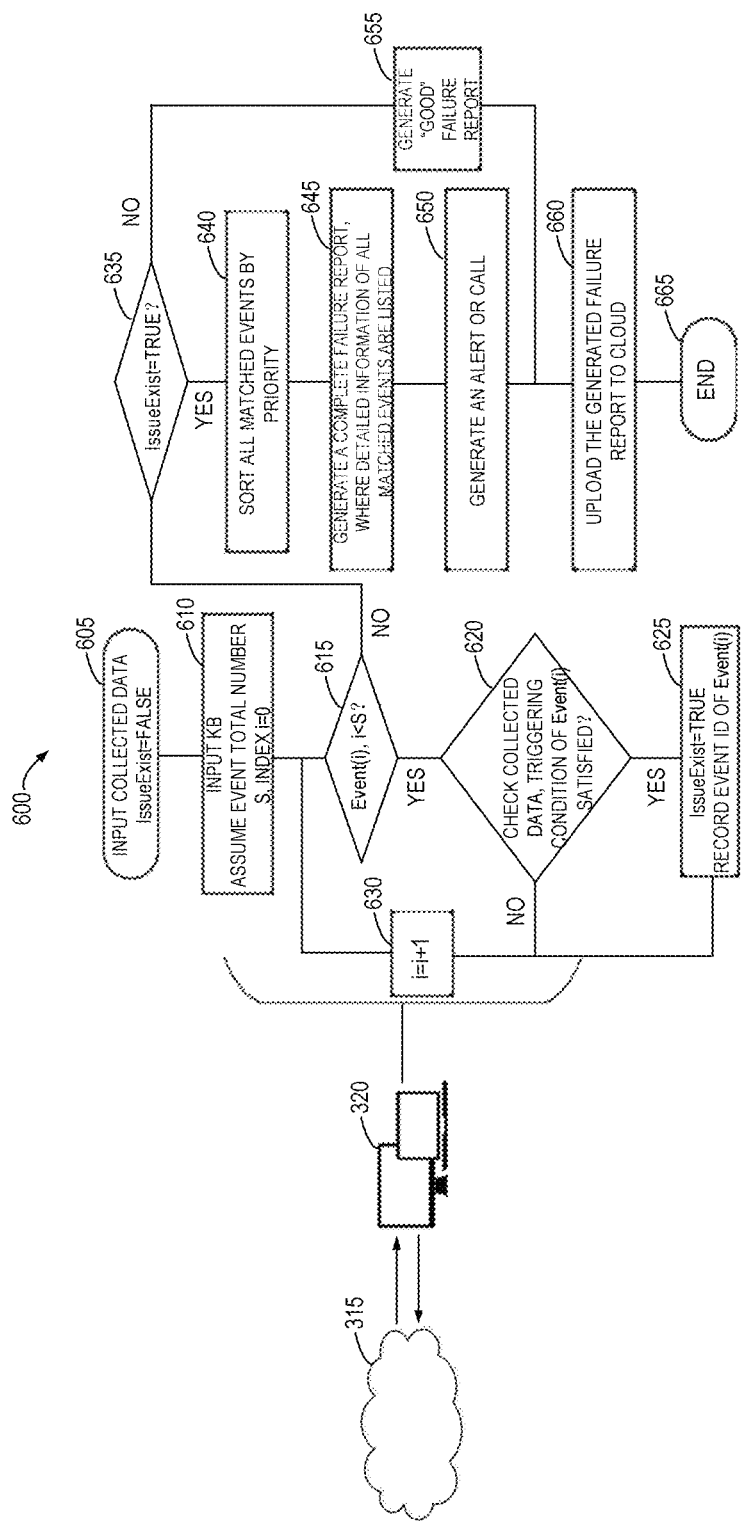
FIG. 6 illustrates an example process of avoiding occurrence of a potential failure event on a disk array according to some embodiments of the present disclosure.

As shown in FIG. 6, at block 605, the collected data are input, and a flag bit is initialized as IssueExist=FALSE. At block 610, the knowledge database (KB) is input, and assuming that a total number of events included in the knowledge database is S (which is any appropriate positive integer), an index is initialized as i=0. At block 615, it is determined whether Event(i) exists, where i<S, and Event(i) represents the $i^{th}$ event of the S events. If yes, the process 600 proceeds to block 620 where the collected data are checked to determine whether a triggering condition of Event(i) is satisfied. If yes, at block 625, the flag bit is set as IssueExist=TRUE, and the event ID of Event(i) is recorded. At block 630, i=i+1, and the process returns to block 615 to determine whether there exist events having not performed matching.

If it is determined at block 615 that there is no event having not performed matching, the process 600 proceeds to block 635, where it is determined whether the flag bit IssueExist=TRUE. If yes, at block 640, all the matched events recorded are sorted by priority. At block 645, a complete failure report is generated, in which detailed information of all matched events are listed. At block 650, an alert or call is generated. If it is determined at block 635 that the flag bit IssueExist=TRUE fails, the process 600 proceeds to block 655 where a failure report indicating the disk array 305 as "GOOD" is generated. Then, at block 660, the generated failure report is uploaded to the cloud 315. The process 600 ends at block 665.

Figure 7:
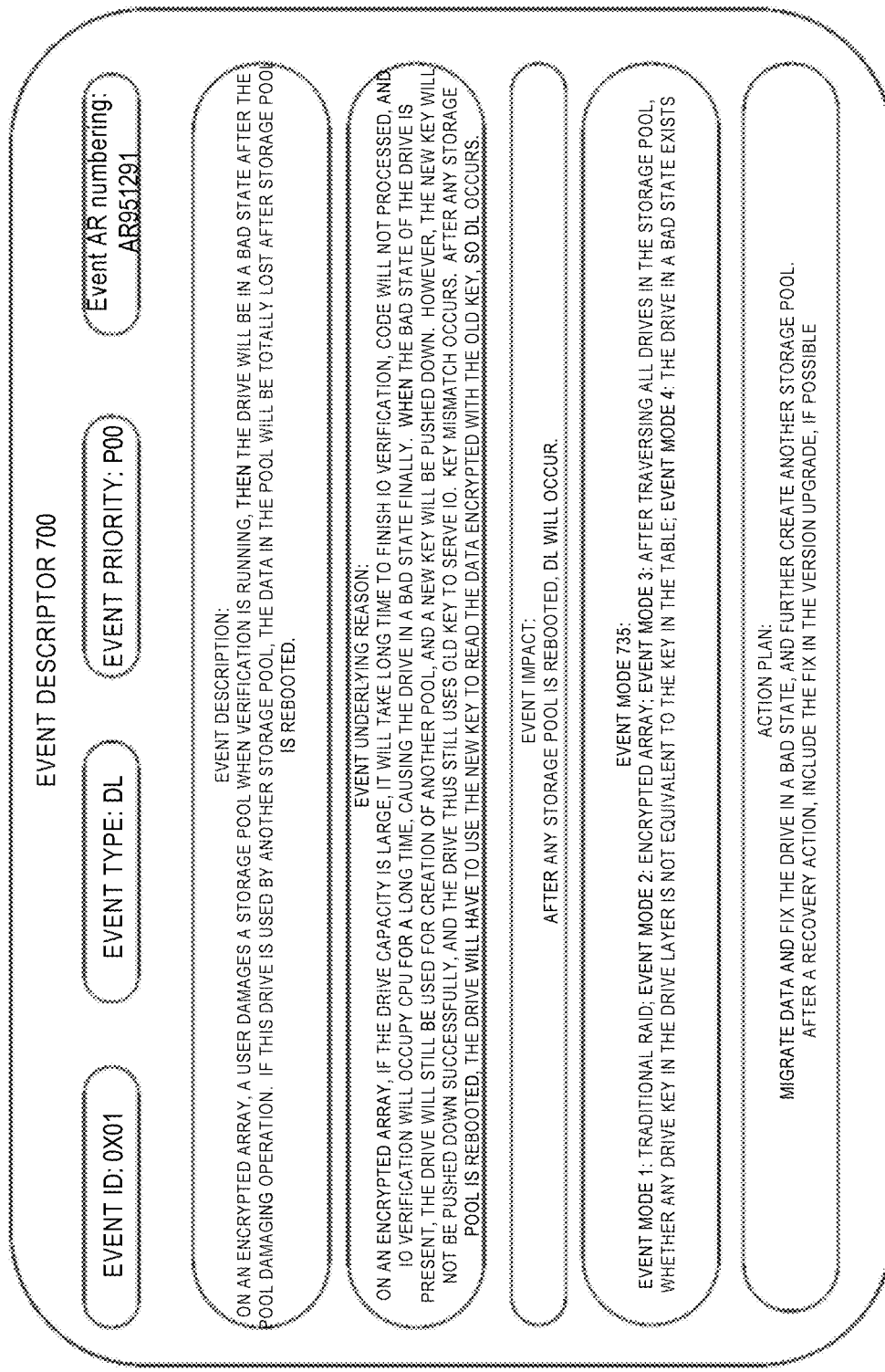
FIG. 7 illustrates an event descriptor of an example failure event according to some embodiments of the present disclosure.

The process of avoiding an example failure event will be described below with reference to FIG. 7 which illustrates an event descriptor 700 of the example failure event. In this example, the computing device 320 analyzes the collected data after obtaining the collected data of the disk array 305 daily via the cloud 315.

The computing device 320 may determine whether the collected data match event modes 1 through 4 of the event modes 735 indicating the triggering conditions of the example failure event. If the data match the event modes 1, 2 and 3, IssueExist=TRUE may be recorded, and call user's home is triggered. If the data match the event modes 1, 2 and 4, IssueExists=TRUE may be recorded, and an alert is sent to the user. Moreover, a failure report may be generated which includes all detailed information of the example failure event, and upload the failure report via the cloud 315. If no match exists, IssueExist=FALSE, and the detection result of the disk array 305 is good.

Using various failure events included in the knowledge database, it may be monitored daily whether there are potential failure events on a user's disk array, and a user may be reminded, as needed, of avoiding failure events in advance, to avoid data damage and lost. In this way, the user experience can be improved significantly.

Figure 8:
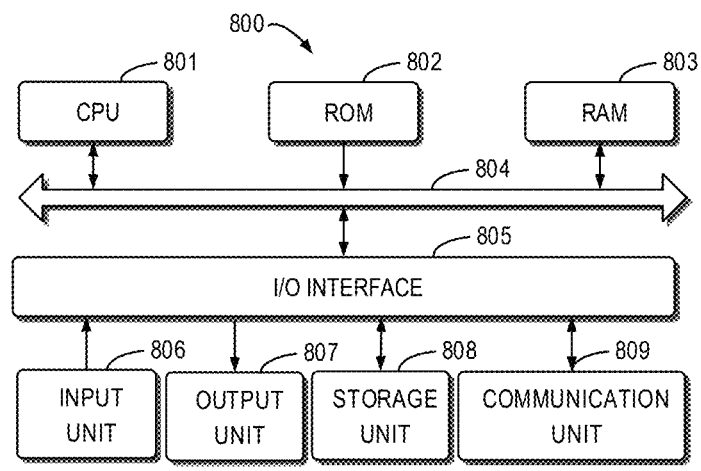
FIG. 8 illustrates a block diagram of a device adapted to implement embodiments of the present disclosure.

FIG. 8 illustrates a block diagram of a device 800 that can be used to implement embodiments of the present disclosure. As shown in FIG. 8, the device 800 includes a controller or a processor, which can also be referred to as a central processing unit (CPU) 801, which performs various appropriate acts and processing, based on programs stored in a read-only memory (ROM) 802 or a random access memory (RAM) 803. The ROM 802 and/or RAM 803 store therein various programs and data required for operations of the device 800. The CPU 801, the ROM 802 and the RAM 803 are connected via a bus 804 with one another. In particular, the device 800 further includes one or more dedicated processing units (not shown) which may also be connected to the bus 804.

An input/output (I/O) interface 805 is also connected to the bus 804. A plurality of components in the device 800 are connected to the I/O interface 805, including: an input unit 806 such as a keyboard, a mouse and the like; an output unit 807 including various kinds of displays and a loudspeaker, etc.; a storage unit 808 including a magnetic disk, an optical disk, and etc.; a communication unit 809 including a network card, a modem, and a wireless communication transceiver, etc. The communication unit 809 allows the device 800 to exchange information/data with other devices through a computer network such as the Internet and/or various kinds of telecommunications networks. In particular, in embodiments of the present disclosure, the communication unit 809 supports communication with a user terminal or other devices.

In some embodiments, CPU 801 may be configured to execute various processes and processing described above, e.g., the method 500. For example, in some embodiments, the method 500 may be implemented as a computer software program that is tangibly included in a machine readable medium, e.g., the storage unit 808. In some embodiments, part or all of the computer programs may be loaded and/or mounted onto the device 800 via ROM 802 and/or communication unit 809. When the computer program is loaded to the RAM 803 and executed by the CPU 801, one or more steps of the method 500 as described above may be executed. Alternatively, in other embodiments, CPU 801 may also be configured to implement the processes/methods described above in any other suitable way.

Particularly, according to embodiments of the present disclosure, the processes as described above with reference to FIGS. 1-8 may be implemented as a computer program product which may be tangibly stored on a non-transient computer readable storage medium and include computer executable instructions. The instructions, when executed, cause the device to perform aspects of the present disclosure.

The computer readable storage medium may be a tangible device that can store instructions for use by an instruction execution device. The computer readable storage medium may include, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of devices, methods, and computer program products according to embodiments of the disclosure. It will be understood that each block of the flowchart illustrations and/or block diagrams, and combinations of blocks in the flowchart illustrations and/or block diagrams, can be implemented by computer readable program instructions.

The descriptions of the various embodiments of the present disclosure have been presented for purposes of illustration, but are not intended to be confined to the embodiments disclosed. Without departing from the spirits of the present disclosure, all modifications and variations is to still fall within the scope of the present disclosure as defined by the claims.

The invention claimed is:

1. A method of avoiding a potential failure event on a disk array, comprising:
   collecting, by a data collection system from the disk array, data for the disk array; obtaining, by circuitry of a computing device, from the data collection system, data collected for the disk array, wherein obtaining the collected data comprises obtaining, via cloud, the collected data for the disk array;
   determining, based on the collected data and by the circuitry, whether the potential failure event is to occur on the disk array;
   in response to determining that the potential failure event is to occur on the disk array, determining, by the circuitry, an action to be taken for the disk array, to avoid occurrence of the potential failure event; and
   wherein the data collection system collects the data for the disk array from the disk array periodically by collecting performance data for the disk array from the disk array at a first rate and collecting configuration data for the disk array from the disk array at a second rate, wherein the second rate is slower than the first rate.

2. The method of claim 1, wherein determining whether the potential failure event is to occur on the disk array comprises:
   determining, based on the collected data, whether a triggering condition of the potential failure event is satisfied; and
   in response to determining that the triggering condition of the potential failure event is satisfied, determining that the potential failure event is to occur on the disk array.

3. The method of claim 2, wherein the potential failure event is one historical failure event of a plurality of historical failure events having occurred, and the method further comprises:
   performing statistics on the plurality of historical failure events, to generate description information of the respective historical failure events of the plurality of historical failure events, the description information comprising triggering conditions of the respective historical failure events of the plurality of historical failure events.

4. The method of claim 3, wherein the description information further comprises an action for avoiding the respective historical events of the plurality of historical failure events, and determining the action to be taken for the disk array comprises:
   determining the action for avoiding the one historical failure event of the plurality of historical failure events as the action to be taken for the disk array.

5. The method of claim 1, wherein the data are collected from the disk array in a predetermined cycle.

6. The method of claim 1, further comprising:
   generating a failure report of the disk array, to indicate the potential failure event and the action to be taken; and
   sending the failure report via cloud.

7. The method of claim 1, wherein the data collection system comprises a Software as a Service (SaaS) management application.

8. A system for avoiding a potential failure event on a disk array, comprising:
   at least one processor; and
   at least one memory storing computer executable instructions, the computer executable instructions which, when executed by the processor, causing the processor to perform operations, the operations comprising:
   collecting, by a data collection system from the disk array, data for the disk array;
   obtaining, by a computing device from the data collection system, data collected for the disk array, wherein obtaining the collected data comprises obtaining, via cloud, the collected data for the disk array;
   determining, based on the collected data, whether the potential failure event is to occur on the disk array;
   in response to determining that the potential failure event is to occur on the disk array, determining an action to be taken for the disk array, to avoid occurrence of the potential failure event; and
   wherein the data collection system collects the data for the disk array from the disk array periodically by collecting performance data for the disk array from the disk array at a first rate and collecting configuration data for the disk array from the disk array at a second rate, wherein the second rate is slower than the first rate.

9. The system of claim 8, wherein determining whether the potential failure event is to occur on the disk array comprises:
   determining, based on the collected data, whether a triggering condition of the potential failure event is satisfied; and
   in response to determining that the triggering condition of the potential failure event is satisfied, determining that the potential failure event is to occur on the disk array.

10. The system of claim 9, wherein the potential failure event is one historical failure event of a plurality of historical failure events having occurred, and the operations further comprising:
    performing statistics on the plurality of historical failure events, to generate description information of the respective historical failure events of the plurality of historical failure events, the description information comprising triggering conditions of the respective historical failure events of the plurality of historical failure events.

11. The system of claim 10, wherein the description information further comprises an action for avoiding the respective historical events of the plurality of historical failure events, and determining the action to be taken for the disk array comprises:
   determining the action for avoiding the one historical failure event of the plurality of historical failure events as the action to be taken for the disk array.

12. The system of claim 8, wherein the data are collected from the disk array in a predetermined cycle.

13. The system of claim 8, the operations further comprising:
   generating a failure report of the disk array, to indicate the potential failure event and the action to be taken; and
   sending the failure report via cloud.

14. A computer program product tangibly stored on a non-transitory computer readable medium and comprising executable instructions, the executable instructions, when executed, causing at least one processor to perform operations, the operations comprising:
   collecting, by a data collection system from a disk array, data for the disk array, wherein the data collection system collects the data for the disk array from the disk array periodically by collecting performance data for the disk array from the disk array at a first rate and collecting configuration data for the disk array from the disk array at a second rate, wherein the second rate is slower than the first rate;
   obtaining, by a computing device from the data collection system, data collected for the disk array;
   determining, based on the collected data, whether the potential failure event is to occur on the disk array; and
   in response to determining that the potential failure event is to occur on the disk array, determining an action to be taken for the disk array, to avoid occurrence of the potential failure event.

15. The computer program product of claim 14, wherein determining whether the potential failure event is to occur on the disk array comprises:
   determining, based on the collected data, whether a triggering condition of the potential failure event is satisfied; and
   in response to determining that the triggering condition of the potential failure event is satisfied, determining that the potential failure event is to occur on the disk array.

16. The computer program product of claim 15, wherein the potential failure event is one historical failure event of a plurality of historical failure events having occurred, and the operations further comprising:
   performing statistics on the plurality of historical failure events, to generate description information of the respective historical failure events of the plurality of historical failure events, the description information comprising triggering conditions of the respective historical failure events of the plurality of historical failure events.

17. The computer program product of claim 16, wherein the description information further comprises an action for avoiding the respective historical events of the plurality of historical failure events, and determining the action to be taken for the disk array comprises:
   determining the action for avoiding the one historical failure event of the plurality of historical failure events as the action to be taken for the disk array.

18. The computer program product of claim 14, wherein the data are collected from the disk array in a predetermined cycle.

* * * * *